United States Patent
Gille et al.

(10) Patent No.: US 7,938,616 B2
(45) Date of Patent: May 10, 2011

(54) SEALING SYSTEM BETWEEN TWO COAXIAL ROTARY SHAFTS

(75) Inventors: Laurent Gille, Dammarie les Lys (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 864 days.

(21) Appl. No.: 11/868,043

(22) Filed: Oct. 5, 2007

(65) Prior Publication Data

US 2008/0089624 A1 Apr. 17, 2008

(51) Int. Cl.
*F01D 11/04* (2006.01)
(52) U.S. Cl. ............ 415/111; 415/113; 415/171.1; 415/174.2; 415/230; 415/231
(58) Field of Classification Search .......... 415/110, 415/111, 112, 113, 229, 230, 231, 171.1, 415/174.2
See application file for complete search history.

(56) References Cited

U.S. PATENT DOCUMENTS

| | | | | |
|---|---|---|---|---|
| 3,085,838 A | * | 4/1963 | Patterson | 384/466 |
| 4,013,141 A | * | 3/1977 | James | 184/6.11 |
| 4,265,334 A | * | 5/1981 | Benhase, Jr. | 184/6.11 |
| 4,426,087 A | * | 1/1984 | Sargent et al. | 277/422 |
| 4,683,714 A | * | 8/1987 | Thebert | 60/772 |
| 5,738,488 A | * | 4/1998 | Gazzillo et al. | 415/112 |
| 6,196,790 B1 | * | 3/2001 | Sheridan et al. | 415/111 |
| 6,629,816 B2 | * | 10/2003 | Giesler et al. | 415/111 |
| 7,329,048 B2 | * | 2/2008 | Klusman et al. | 384/99 |

FOREIGN PATENT DOCUMENTS

FR 1 284 281 A 2/1962

* cited by examiner

*Primary Examiner* — Igor Kershteyn
(74) *Attorney, Agent, or Firm* — Oblon, Spivak, McClelland, Maier & Neustadt, L.L.P.

(57) ABSTRACT

A dynamic sealing system between two coaxial rotary shafts respectively comprising an inner shaft and an outer shaft. Connected to the inner shaft, the system comprises a sectorized annular assembly of wipers that are movable under the effect of centrifugal force, and an annular receptacle for liquid arranged in the inside surface of the outer shaft.

12 Claims, 4 Drawing Sheets

SEALING SYSTEM BETWEEN TWO COAXIAL ROTARY SHAFTS

The invention relates to a sealing system between two coaxial rotary shafts, and it relates more particularly to a novel type of dynamic seal arranged between the two shafts.

BACKGROUND OF THE INVENTION

In an airplane turbojet, for example, it is necessary to define and isolate an enclosure surrounding a mechanical member such as a bearing or a gear installed between two rotary shafts. Oil is injected into the enclosure to lubricate and to cool said mechanical member. Isolating the enclosure requires, in particular, a seal to be used between the two rotary shafts.

In that type of application, a distinction is made between seals that involve contact and those without contact. A seal with contact (a carbon gasket or a brush gasket) involves wear. It therefore needs to be changed periodically. In addition, the fragility of a carbon gasket can make it difficult to put into place. It is often also necessary to have a small flow of air entering the enclosure in order to maintain pressurization of the enclosure. Wear is even greater when the shafts are contra-rotating shafts.

A seal without contact, such as a labyrinth seal, requires air to be delivered at a much greater rate and it is sometimes difficult to obtain the desired pressure. In addition, an air and oil mixture is created inside the enclosure, which requires a de-oiling device before the air can be exhausted. The effectiveness of such a device is inversely proportional to the flow rate of air that it is to treat. It is therefore difficult to reach a compromise. Furthermore, a de-oiling device is expensive, bulky, and heavy.

The invention enables those various drawbacks to be overcome by proposing a seal structure, without delivering external air, and without wear that is harmful to the effectiveness of the system in the long term.

OBJECTS AND SUMMARY OF THE INVENTION

To this end, in a first aspect, the invention provides a sealing system between two coaxial rotary shafts, respectively an inner shaft and a tubular outer shaft, the system including, connected to the inner shaft, at least one sectorized annular assembly of wipers that is movable under the effect of centrifugal force and that moves substantially radially towards the outer shaft, and an annular receptacle for liquid arranged in the inside surface of the outer shaft facing the curved edges of said wipers, said curved edges dipping into said liquid when said wipers are moved under the effect of centrifugal force.

Thus, when the outer shaft is rotating and liquid is deposited in the annular receptacle, a ring of centrifuged liquid is formed, into which said wipers dip.

The liquid is preferably oil.

The system preferably has two of the above-specified wiper assemblies that are angularly offset relative to each other. For example each assembly may have four wipers, each occupying a sector of 90° in the rest state.

In one possible embodiment, the two wiper assemblies are arranged facing each other.

In another possibility, the two wiper assemblies are coaxial, one within the other.

In a preferred example, an above-specified wiper in a given assembly comprises a shutter element having a substantially radial rib with a curved edge, while said shutter element is connected to a flexible blade anchored to the bottom of a support, in which there is defined a cylindrical cavity that is open at one end, said support being fastened to the outside surface of said inner shaft. Said shutter element co-operates with the open end of said cylindrical cavity.

Preferably, the shutter element includes a cylindrical portion adjacent to said flat rib and attached along an edge thereof.

For example, said flexible blade extends from the middle of said cylindrical portion. Said flexible blade may be attached close to one end of the shutter element so as to encourage the movement of one of the ends as a priority when set into rotation.

According to another remarkable characteristic, said inside surface of the outer shaft includes an annular groove situated facing said sectorized annular assembly of wipers, and a nozzle for oil or the like is disposed in the vicinity of said groove and is oriented to deposit oil therein on each occasion said outer shaft is set into rotation.

The invention is particularly applicable when the two shafts are contra-rotating shafts.

BRIEF DESCRIPTION OF THE DRAWINGS

The invention can be better understood and other advantages thereof appear more clearly in the light of the following description of several possible embodiments of a sealing system in accordance with the principle of the invention given by way of example and described with reference to the accompanying drawings, in which:

FIG. 1A is a section on I-I of FIG. 1;

MORE DETAILED DESCRIPTION

Figure 1:
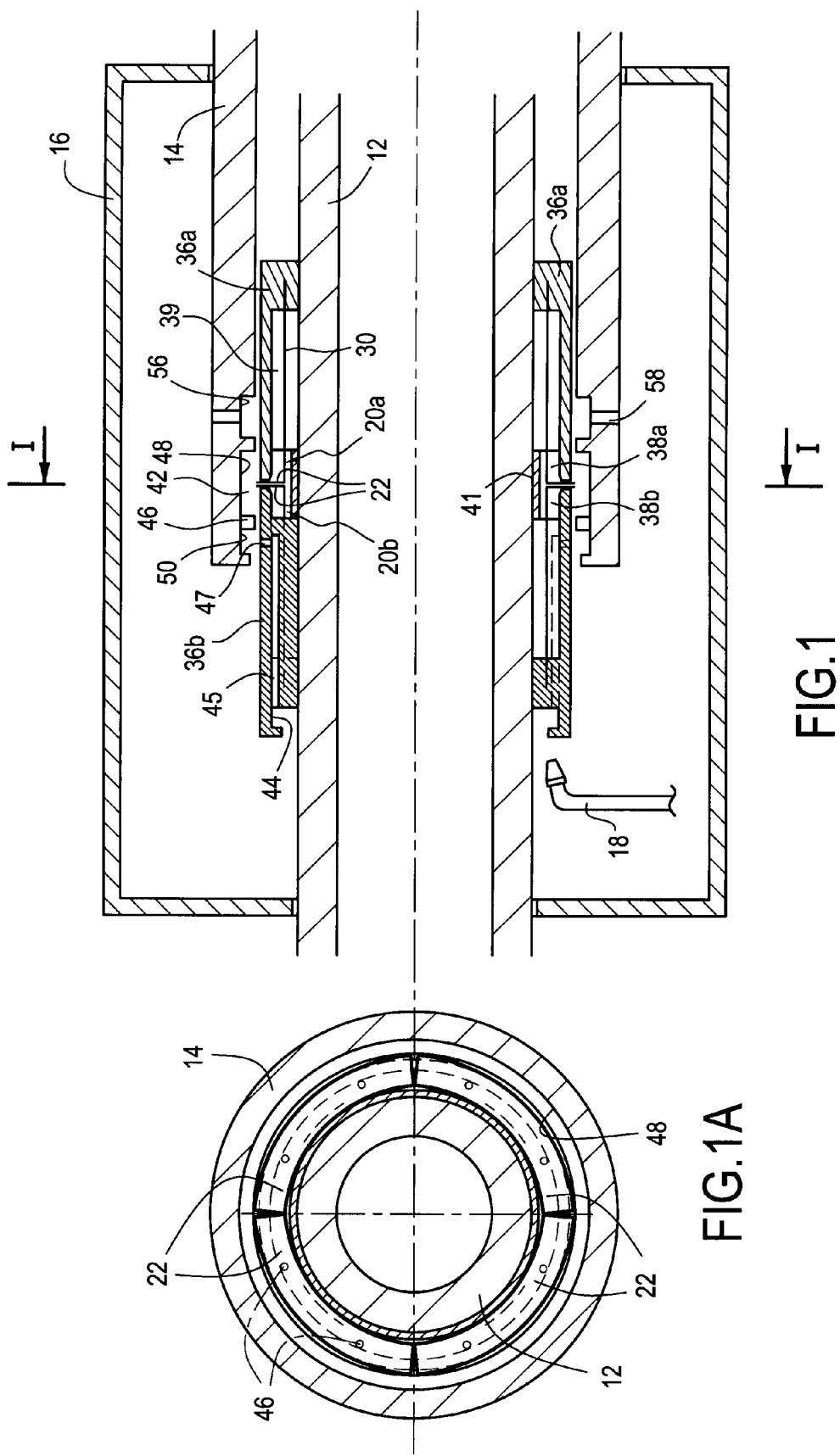
FIG. 1 is a diagrammatic section view of a sealing system between two coaxial shafts, shown at rest.
Figures 2, 2A:
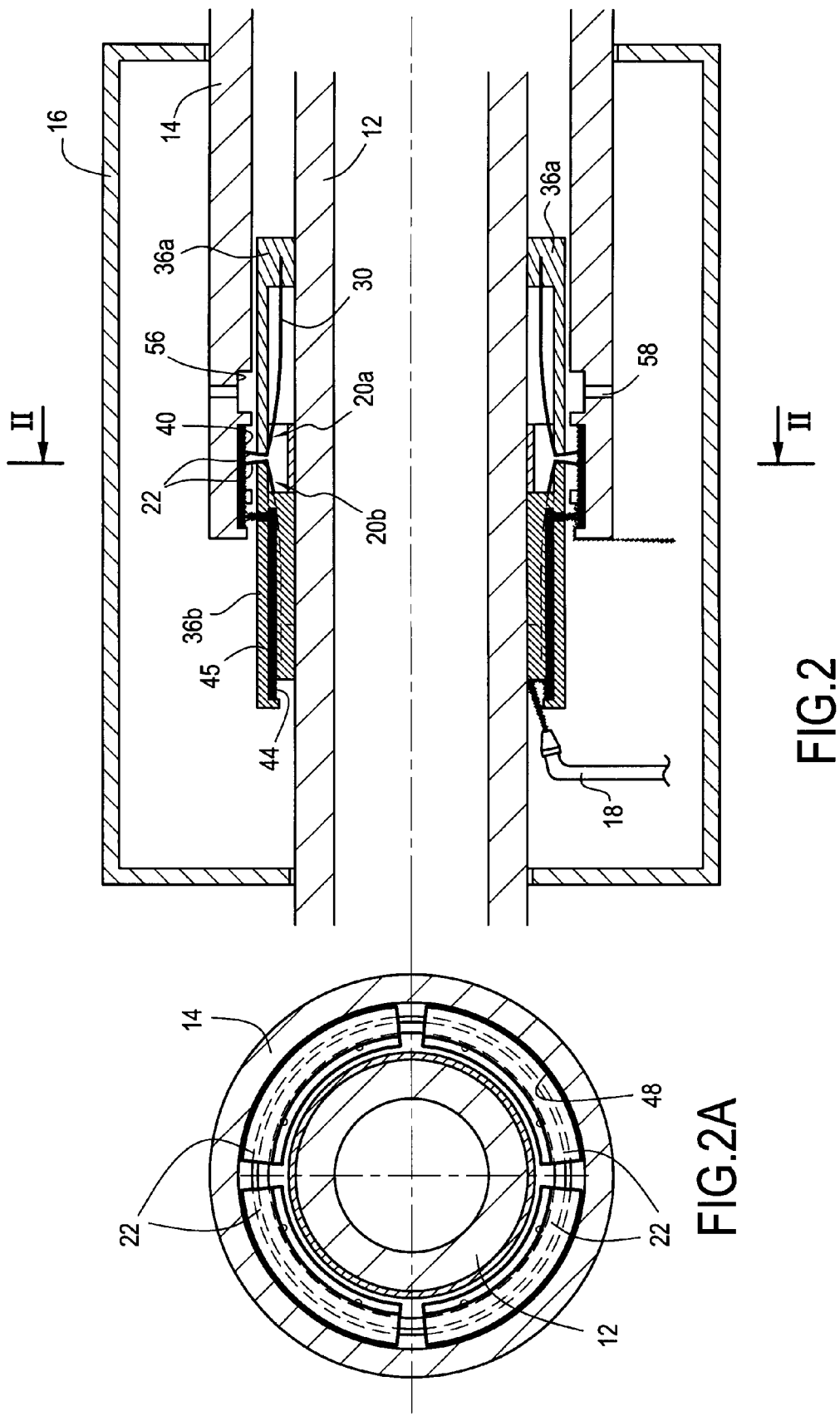
FIG. 2 is a view analogous to FIG. 1 showing the operation of the sealing system when both shafts are in rotation.
FIG. 2A is a section on II-II of FIG. 2.

With reference more particularly to FIGS. 1 and 2, and the corresponding sections, there can be seen two coaxial rotary shafts, respectively an inner shaft 12 and a tubular outer shaft 14. The two shafts are disposed one within the other. The sealing system in accordance with the invention is installed between these two rotary shafts, inside a housing 16 extending between the outside surface of the inner shaft and the inside surface of the outer shaft. The housing houses a nozzle 18 for projecting a liquid, specifically oil in this example. The oil is fed to the sealing system as soon as the outer shaft is in rotation.

According to an important characteristic of the invention, the sealing system comprises at least one sectorized annular assembly 20a, 20b of wipers 22 that are movable under the effect of centrifugal force that move substantially radially towards the outer shaft 14 when they are subjected to said force. The wipers 22 are connected to the inner shaft.

Most preferably, the sealing system has two of the above-mentioned wiper assemblies 20a and 20b that are angularly offset relative to each other. The arrangement can be seen particularly clearly in FIGS. 5 and 6. In the example of FIGS.

1 and 2, the wiper assemblies 20a and 20b are arranged facing each other. In this example, each assembly has four wipers 22 that are curved and that occupy respective 90° sectors.

In a given assembly, an above-mentioned wiper 22 includes a shutter element 24 constituted in this example by a flat rib 26 and a cylindrical portion 28 adjacent to said flat rib and attached thereto along an edge. The flat rib projects outwards, i.e. towards the inside surface of the outer shaft 14. It has a curved edge 29 of circular outline. This flat rib 26 extends substantially in a radial plane when in the rest position.

The shutter element 24 is also attached to a flexible blade 30 anchored to the bottom of a support 36a or 36b in which a cylindrical cavity 38a or 38b is defined. The support is cylindrical and it is secured to the outside surface of said inner shaft. The cylindrical cavity is open at its end where the shutter element 24 is situated. The flat rib 26 extends outside the cavity, and the shutter element co-operates with the open end of said cavity. The cylindrical cavity 38a or 38b is extended in the support by longitudinal recesses 39 in which the flexible blade 30 extend. These blades are anchored to the support at the bottoms of the recesses. In the example of FIG. 1, the inner shaft has two supports 36a, 36b with two open cylindrical cavities 38a, 38b whose open ends face each other. Each support 36a, 36b houses an assembly of wipers and these co-operate with the open end of the corresponding cavity 38a, 38b. Because of the flexibility of the tongue, each wiper can thus move substantially radially (with a small amount of movement in rotation) towards the outer shaft, under the effect of the centrifugal force imparted by rotation of the inner shaft. A spacer 41 interposed between the two supports enables the axial distance between the assemblies 20a and 20b to be adjusted.

Furthermore, according to another remarkable characteristic of the invention, an annular liquid receptacle, in this case constituted by a groove 42 formed in the inside surface of the outer shaft serves, when the outer shaft is rotating, to create a ring 40 of centrifuged liquid. This ring is sustained at the inside surface of said outer shaft 14, facing the curved edges of said wipers, and more particularly the edges 29 of the ribs 26.

In this example, the liquid is advantageously oil.

The annular groove 42 is situated facing the or each sectorized annular wiper assembly, while the oil nozzle is disposed in the vicinity of said groove and is oriented so as to deposit oil therein on each occasion the outer shaft is set into rotation. Consequently, under the effect of the centrifugal force communicated by the rotation of the outer shaft, the liquid (oil) accumulates and is maintained in the bottom of the annular groove. In operation, the cylindrical portion 28 bears against the support 36 in such a manner that the curved edge 29 dips into the liquid without touching the bottom of the groove 42.

When the wipers 22 move towards the outer shaft, the curved edges of the ribs dip into the ring of oil (see FIG. 2) and, on coming into abutment at the end of the support 36a or 36b, they remain in this position under the effect of the centrifugal force, thereby providing sealing.

In the embodiment of FIGS. 1 and 2, a groove 44 is defined at one end of the support 36b secured to the inner shaft and in which there is defined the cavity 38b, and said groove is extended by holes 45, 47 formed in the support. The holes open out radially in register with the annular groove 42 formed in the inside surface of the outer shaft so as to be feed said centrifuged ring of oil that is sustained in said annular groove.

Advantageously, the annular groove includes a settling barrier 46 arranged between an annular portion 48 into which said wipers dip and an adjacent annular portion 50, in which the oil is deposited. More precisely, this adjacent annular portion faces the orifices of the holes 47. The generally annular settling barrier includes at least one notch or the like allowing oil to pass from one portion to the other.

Another annular groove 56 is adjacent to the groove arranged facing the wipers. It is formed in the inside face of the outer shaft in the space between the shaft and it communicates with the housing via a drain passing through the shaft. Any leakage of oil is thus recovered in side the casing. The oil that falls into the casing can be recovered and recycled.

Figure 5:
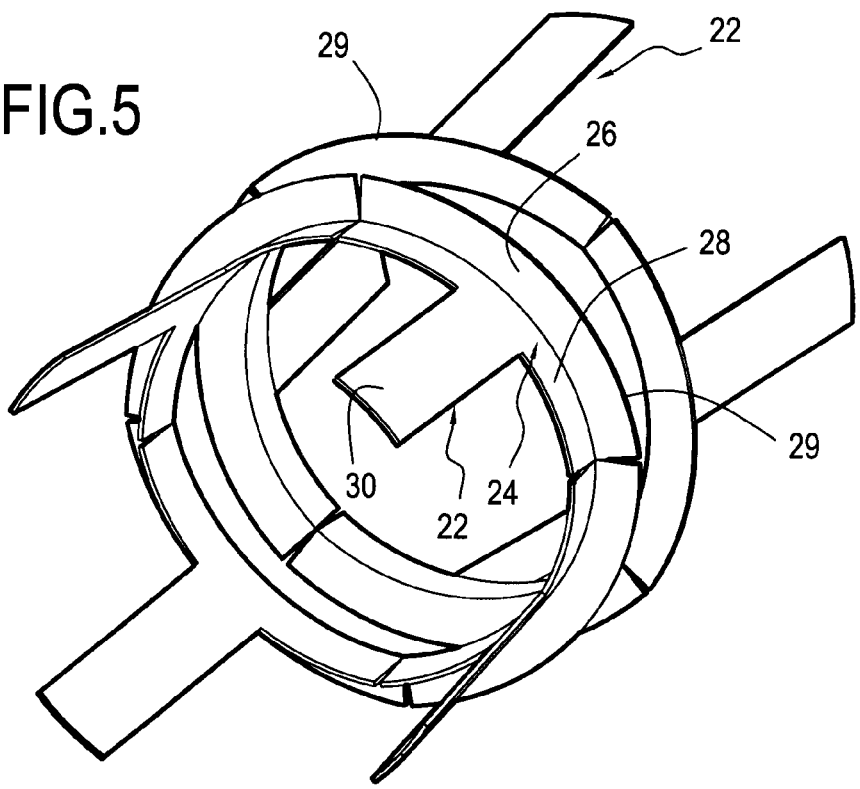
FIG. 5 is a perspective view of two wiper assemblies shown with an axial offset, at rest.
Figure 6:
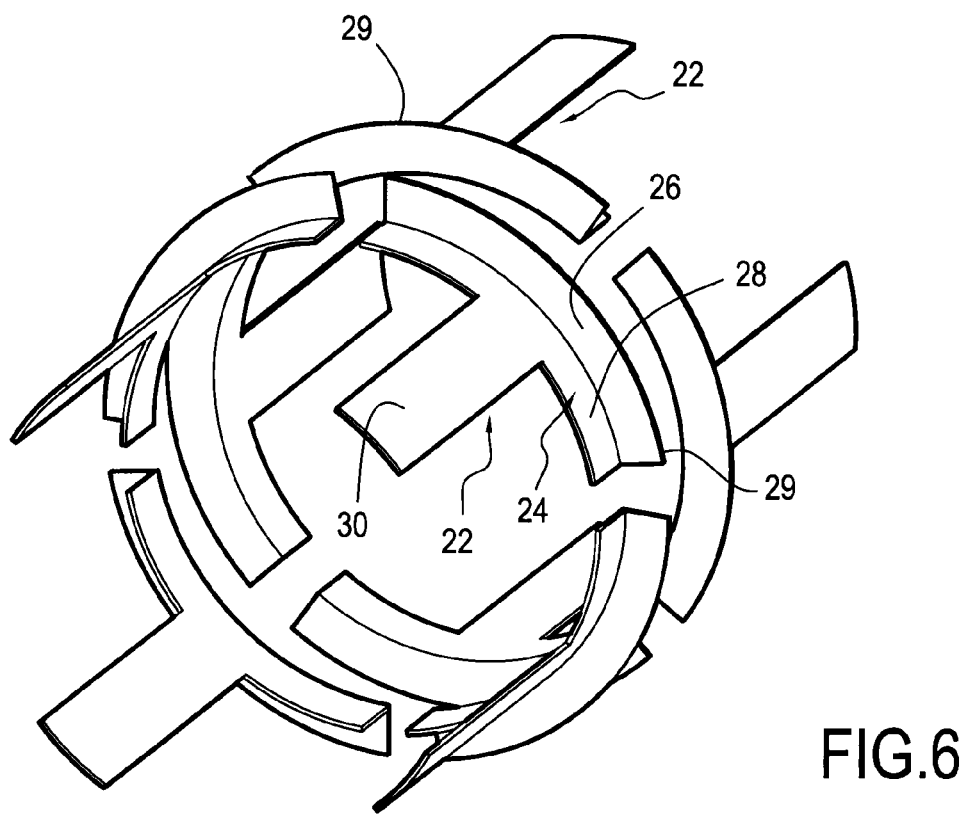
FIG. 6 shows the same wiper assemblies when in operation.

As shown in FIGS. 1A and 2A, and also in FIGS. 5 and 6, the curved inside edges of the shutter element 24 come substantially into contact via their ends when the wipers are not subjected to centrifugal force. In contrast, under the effect of centrifugal force, the gaps between the ends of the wipers increase, whence the advantage of providing two wiper assemblies that circumferentially offset. For assemblies that are each constituted by four wipers, said assemblies are offset by 45°.

Figure 3:
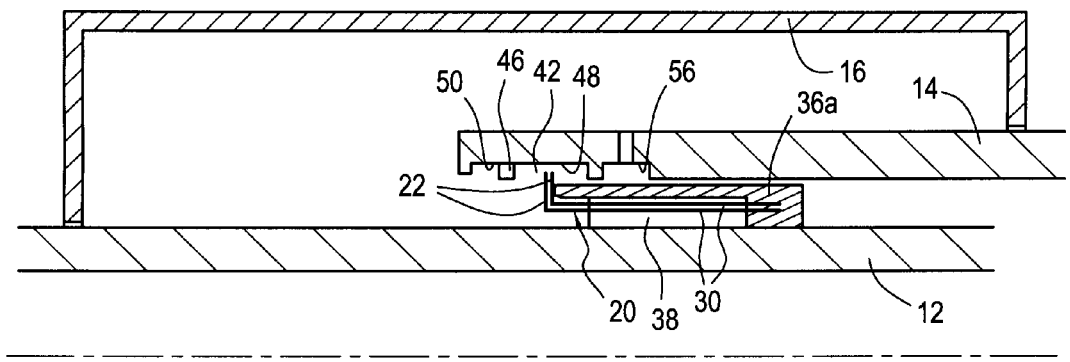
FIG. 3 is a view analogous to FIG. 1 showing a variant.
Figure 4:
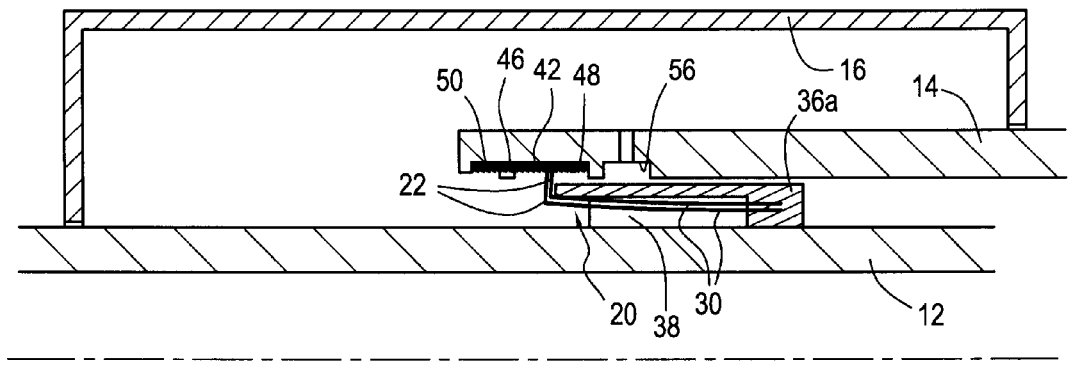
FIG. 4 is a view analogous to FIG. 2 showing the same variant, but in operation.

In the embodiment of FIGS. 3 and 4, the inner shaft has a single open cylindrical cavity 38 defined in a single cylindrical support 36a fitted on the outside surface of the shaft. In contrast, the shutter elements 24 of both wiper assemblies are housed coaxially in the same cylindrical cavity. The shutter elements of both assemblies 20a, 20b of wipers 22 co-operate together with the open end of the cavity 38.

Thus, the two wiper assemblies are superposed one on the other. Naturally they are offset circumferentially as in the preceding example, and for the same reasons.

In this embodiment where analogous elements are given the same numerical references, the nozzle 18 is directed directly towards the annular groove 42 which defines the ring of centrifuged liquid. As in the preceding example, the annular groove includes a settling barrier 46 situated between the annular portion 48 into which the wipers dip, and the adjacent annular portion 50 in which the oil is deposited by the nozzle.

What is claimed is:

1. A sealing system between two coaxial rotary shafts, respectively an inner shaft and a tubular outer shaft, the system including, connected to the inner shaft, at least one sectorized annular assembly of wipers that is movable under the effect of a centrifugal force and that moves substantially radially towards the outer shaft, and an annular receptacle for a liquid arranged in an inside surface of the outer shaft facing curved edges of said wipers, said curved edges dipping into said liquid when said wipers are moved under the effect of centrifugal force.

2. A system according to claim 1, having two of the above-specified assemblies of wipers that are offset circumferentially relative to each other.

3. A system according to claim 2, wherein the two assemblies of wipers are arranged facing each other.

4. A system according to claim 2, wherein the two assemblies of wipers are coaxial, one within the other.

5. A sealing system according to claim 1, wherein an above-specified wiper in a given assembly comprises a shutter element having a substantially radial rib with a curved edge, and wherein said shutter element is connected to a flexible blade anchored to a bottom of a support connected to the inner shaft, in which there is defined a cylindrical cavity that is open at one end, said cylindrical cavity being defined in a surface of said inner shaft; and wherein said shutter element co-operates with the open end of said cylindrical cavity.

6. A system according to claim 5, wherein said shutter element includes a cylindrical portion adjacent to said flat rib and attached along an inside edge thereof.

7. A sealing system according to claim 3, wherein an above-specified wiper in a given assembly comprises a shutter element having a substantially radial rib with a curved edge, and wherein said shutter element is connected to a flexible blade anchored to the bottom of a support connected to the inner shaft, in which there is defined a cylindrical cavity that is open at one end, said cylindrical cavity being defined in the surface of said inner shaft; and wherein said shutter element co-operates with the open end of said cylindrical cavity, and wherein said inner shaft has two open cylindrical cavities of which said open ends face each other, the shutter elements in a given assembly of wipers co-operating with the open end of a corresponding cavity.

8. A sealing system according to claim 4, wherein an above-specified wiper in a given assembly comprises a shutter element having a substantially radial rib with a curved edge, and wherein said shutter element is connected to a flexible blade anchored to a bottom of a support connected to the inner shaft, in which there is defined a cylindrical cavity that is open at one end, said cylindrical cavity being defined in a surface of said inner shaft; and wherein said shutter element co-operates with the open end of said cylindrical cavity, and wherein said inner shaft has a single open cavity, the shutter elements of the two assemblies of wipers co-operating in superposition with the open end of said single cavity.

9. A system according to claim 1, wherein said inside surface of the outer shaft includes an annular groove situated facing said sectorized annular assembly of wipers, and wherein a nozzle for a liquid is disposed in the vicinity of said groove and is oriented to deposit oil therein on each occasion said outer shaft is set into rotation.

10. A system according to claim 9, wherein said annular groove includes a settling barrier arranged between an annular portion into which said wipers dip and an adjacent annular portion in which the liquid is deposited using said nozzle.

11. A turbomachine, including two coaxial rotary shafts between which there is installed a sealing system according to claim 1.

12. A turbomachine according to claim 11, wherein the two shafts are contra-rotating shafts.

* * * * *